United States Patent [19]

Pepin et al.

[11] 4,404,592
[45] Sep. 13, 1983

[54] VIDEO IMAGERY DEVICE, ESPECIALLY FOR A HOMING UNIT

[75] Inventors: Christian Pepin; Patrick Herlin, both of Paris, France

[73] Assignee: Thomson-CSF, Paris, France

[21] Appl. No.: 312,917

[22] Filed: Oct. 19, 1981

[30] Foreign Application Priority Data

Oct. 21, 1980 [FR] France .............................. 80 22458

[51] Int. Cl.$^3$ .............................................. H04H 5/34
[52] U.S. Cl. ....................... 358/125; 358/109;
358/225; 358/222; 354/70; 356/149
[58] Field of Search ............... 358/128, 109, 108, 225, 358/226, 224, 222; 74/5, 5.22, ; 354/70; 348/182, 183; 350/500; 356/248, 152, 149

[56] References Cited

U.S. PATENT DOCUMENTS 3,854,821 12/1974 Thompson .
3,910,693 10/1975 De La Cierna .................. 354/70
4,010,365 3/1977 Meyers .
4,087,061 5/1978 Burt ................................. 356/248

FOREIGN PATENT DOCUMENTS

2446468 8/1972 France .
2134497 8/1980 France .

*Primary Examiner*—Robert L. Griffin
*Assistant Examiner*—Edward L. Coles
*Attorney, Agent, or Firm*—Cushman, Darby & Cushman

[57] ABSTRACT

In a video imagery device, the detector is mounted on the missile structure and not on a head which is stabilized by gyroscopic action. The device includes optical deflection elements for bringing the stabilized optical receiving system into a position corresponding to the axis of the detector. These optical deflection elements utilize the path of the mechanical axes of rotation in elevation and in azimuth which pass through the center of the gimbal suspension. The device can be equipped to compensate for image rotation produced at the level of the detector.

14 Claims, 14 Drawing Figures

FIG_5

FIG_7

FIG_10

FIG_11-a

FIG_11-b

FIG_11-c

FIG_12

VIDEO IMAGERY DEVICE, ESPECIALLY FOR A HOMING UNIT

BACKGROUND OF THE INVENTION

This invention relates to a video imagery device, especially for a television homing unit. This application is of particular interest but should not be considered as implying any limitation since the device can be incorporated for example in a target-designating system or in a video-contrast tracking system, and so on.

The design solution usually adopted for the construction of a video-imagery homing unit consists in placing the image detector and its optical system on a common support which permits of orientation along two axes, namely a pitch axis and an azimuth axis. The support thus equipped is stabilized either directly by a gyro rotor placed on the same support which is formed by a gimbal suspension or indirectly by means of a mechanical or electrical connection with a stabilized platform. Under these conditions, the optic axis constituting the line-of-sight of the device is stabilized irrespective of the relative orientation of the longitudinal axis of the missile which supports the unit as a whole. This assembly calls for electrical connections between the movable portion of the support which is constituted by a gimbal suspension and carries the detector and the portion which is constituted by the missile and provided with the supply circuits as well as the circuits for processing detected signals. Parasitic torques are consequently induced by the electrical connections and give rise to precession and drift of the gyroscope assembly.

SUMMARY OF THE INVENTION

The aim of the present invention is to overcome such disadvantages by mounting the detector on the fixed structure which is attached to the missile. Since the detector device is no longer carried by the stabilized structure which is movable both in elevation and in azimuth, this results in considerable simplification of the stabilized structure by reason of the suppression of electrical connections between the stationary portion and the moving portion. Elimination of parasitic torques arising from these connections makes it possible to improve the quality of stabilization of the line of sight.

One object of the present invention is to provide a video imagery device comprising a support means for a unit constituted by a receiving optical element for focusing the radiation on an image detector and means for stabilizing the direction of the optic axis of the receiving optical system in which use is made of an assembly having at least two degrees of freedom for permitting spatial rotation of the optic axis relatively to a reference axis associated with the support means. The image detector is fixed directly on the support means, this assembly being made possible by image-displacement means designed to maintain the image centered on the detector during relative rotation between the axes.

According to a further object of the invention, the video imagery device also comprises means which serve to compensate for the image rotation which takes place at the level of the detection plane and results from relative rotation of the axes.

These and other features of the invention will be more apparent upon consideration of the following description and accompanying drawings, wherein:

DESCRIPTION OF THE PREFERRED EMBODIMENTS

Figure 1:
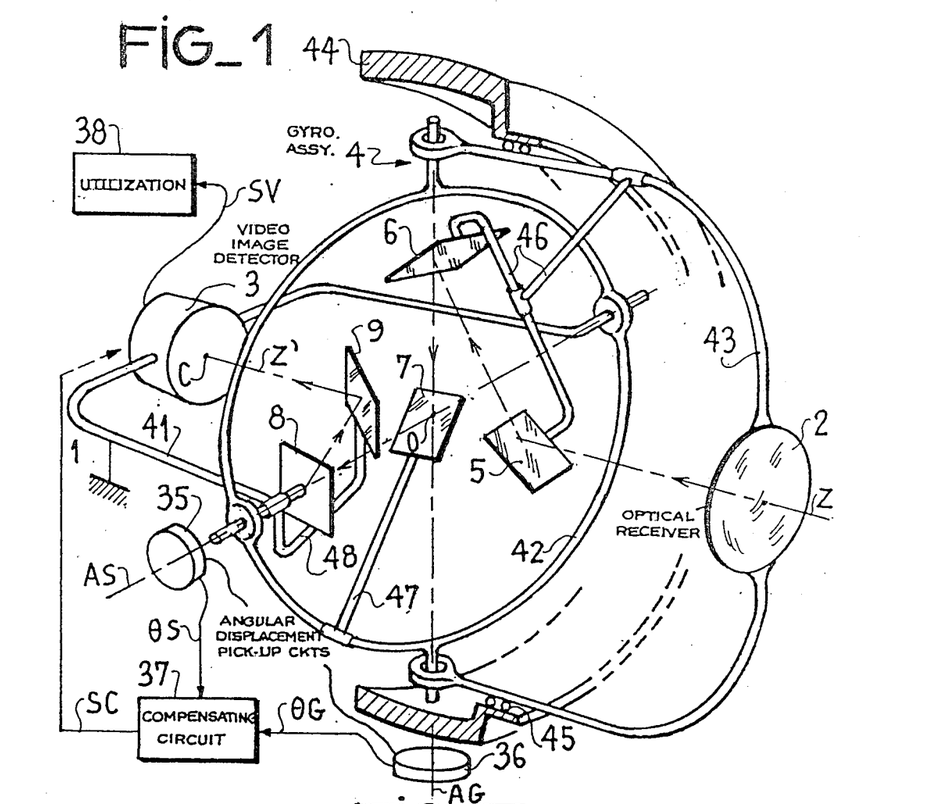
FIG. 1 is a simplified diagram of a video imagery device according to the invention.

Referring to FIG. 1, the video imagery device comprises a support means designated by the reference numeral 1. In the case of a homing unit, the support element 1 will be constituted by the body of the missile. The elements supported by the means 1 comprise an optical receiving element 2 which focuses the radiation on a video image detector 3, and means for stabilizing the direction of the optic axis Z of the optical element 2, or line-of-sight of the device. These means are designated by the general reference numeral 4 and comprise an assembly having at least two degrees of freedom such as a gimbal suspension which permits rotation of the axis Z about a first mechanical axis or so-called azimuth axis AG and about a second mechanical axis or so-called pitch axis AS. These mechanical axes are at right angles to each other and pass through the center O of the gimbal suspension. In this example, the point O constitutes the instantaneous center of rotation of the axis Z. FIG. 1 illustrates a free gyroscope assembly having an outer gyro wheel. The suspension having two degrees of freedom is represented by a first frame 41 rigidly fixed to the support means 1, a central portion in the form of a ring 42 which is capable of rotating in elevation about the pitch axis AS and a second frame 43 which is capable of rotating about the azimuth axis AG. The gyro wheel 44 or gyroscopic mass is driven in rotation about the optic axis or axis of the gyroscope Z and is decoupled from the frame 43 by means 45 such as ball bearings.

In accordance with the invention, the image detector 3 is fixed directly on the support means 1 (in the case shown in the figure by means of the frame 41 which is rigidly fixed to the support member). This configuration is made possible by the arrangement of the device in conjunction with image-displacement means which are intended to maintain the field image centered on the detector and in the photodetection plane during rotation of the axis Z in elevation and/or in azimuth. The optical and therefore static image-displacement means are mounted on the gimbal suspension. Said means can be constructed in particular with optical deviating elements such as mirrors or prisms or alternatively by means of optical fibers. According to the invention the condition satisfied is that the path of the light rays is successively oriented along each of the two axes of the gimbal suspension, namely the pitch axis AS and the azimuth axis AG. The embodiment of FIG. 1 makes use of five reflecting mirrors which serve to prevent a parallax between the entrance optic axis Z of the image-displacement device and the exit optic axis Z'. The axis Z' passes through O, terminates substantially at the center of the detector 3, and constitutes a reference axis since its direction is fixed with respect to the support member 1. In the case of the application which is contemplated, the axis Z' is the longitudinal axis of the missile which carries the homing unit.

Figure 2:
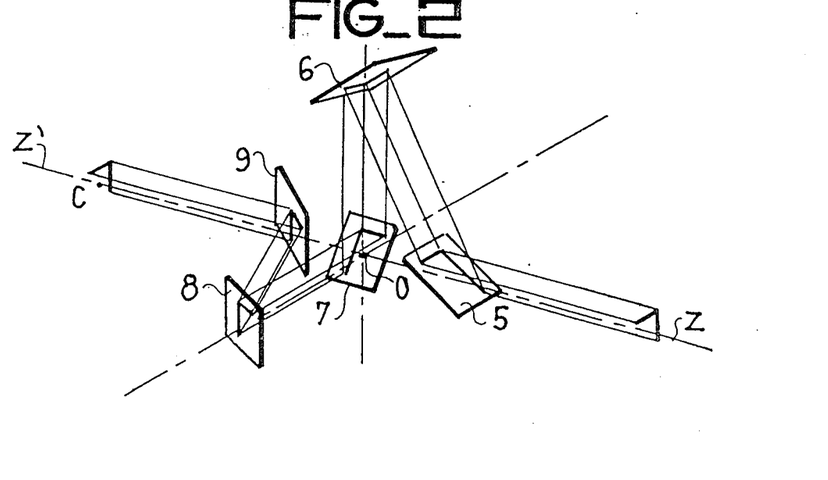
FIG. 2 shows a portion of the diagram of FIG. 1 relating to the optical deviating elements which produce an image displacement.

The operation of the image-displacement device appears in a simplified manner in FIG. 2 in the form of parallel rays. The image of the observed field is focused by the optical element 2 on the photodetection plane of the detector 3 after several successive reflections of the optic axis Z from the mirrors 5 to 9 of the image-displacement device. A first pair of mirrors 5 and 6 is employed for deviating and returning the direction Z along the azimuth axis AG. These mirrors are mounted so as to be rigidly fixed to the third frame 43 by means of mechanical members 46. The mirror 5 is interposed on the axis Z and the mirror 6 is interposed on the axis AG with respective angles of inclination which are so determined as to obtain the desired final reflection along the axis AG. A central mirror 7 is positioned at O and is also inclined at an angle of 45° to the axes AG and AS so as to ensure that the direction of the optical path is subsequently reflected along the pitch axis AS. The mirror 7 is rigidly fixed to the second frame or ring 42 by means of a mechanical arrangement 47. Finally, the pair of mirrors 8 and 9 which is similar to the entrance pair 5-6 produces the end reflection along the exit axis Z'. The mirrors 8 and 9 are rigidly fixed to the first stationary frame 41 by means of fixing members 48, the mirror 8 being positioned on the axis AS and the mirror 9 being positioned on the axis Z' which extends from the center O of the gimbal suspension to the center C of the detector 3. Since the axis Z' is stationary with respect to the support structure 1, all the relative movements in elevation and in azimuth as performed by the entrance axis Z which is stabilized by the gyroscope with respect to said structure do not give rise to any displacement of the exit optic axis Z'. Moreover, the optical path between the lens 2 and the plane of photodetection at 3 remains invariant during these relative movements and the image is always formed in one and the same plane which is associated with the structure 1 and therefore fixed with respect to this latter irrespective of the movements in elevation and in azimuth.

Figures 3, 4:
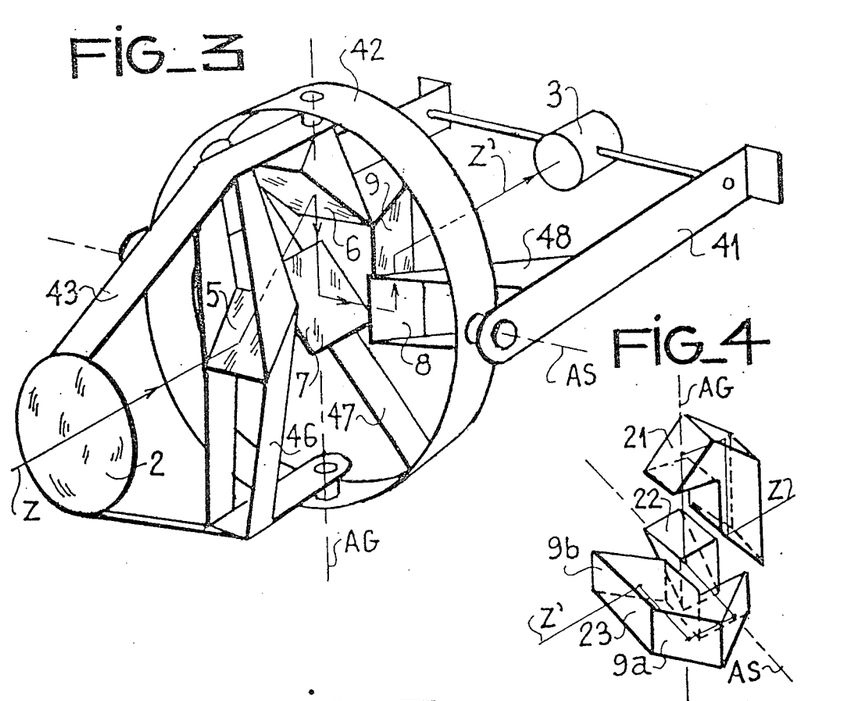
FIG. 3 is a diagram showing one embodiment of the device illustrated in FIG. 1.
FIG. 4 shows one form of construction of the optical deviating system which produces an image displacement.

FIG. 3 illustrates an embodiment of the device in accordance with FIG. 1, the same elements being designated by the same references.

FIG. 4 shows an alternative embodiment of the optical deviating system which produces an image displacement by means of three prisms, namely a first prism 21 or so-called azimuth prism which is adapted to rotate about the azimuth axis AG, a central prism 22 or so-called intermediate prism and a third prism 23 or so-called pitch-axis prism which rotates about the pitch axis AS. It is apparent that this configuration corresponds to the use of seven reflecting mirrors instead of five. The optical reflections can all take place at 90° as shown insofar as the reflecting faces forming mirrors are inclined at 45° with respect to the corresponding directions AS and AG. Compared with the preceding structure, this configuration is equivalent to doubling of the entrance and exit mirrors. Thus the element 9 is replaced by the two reflecting faces 9a and 9b of the prism 23.

Figure 5:
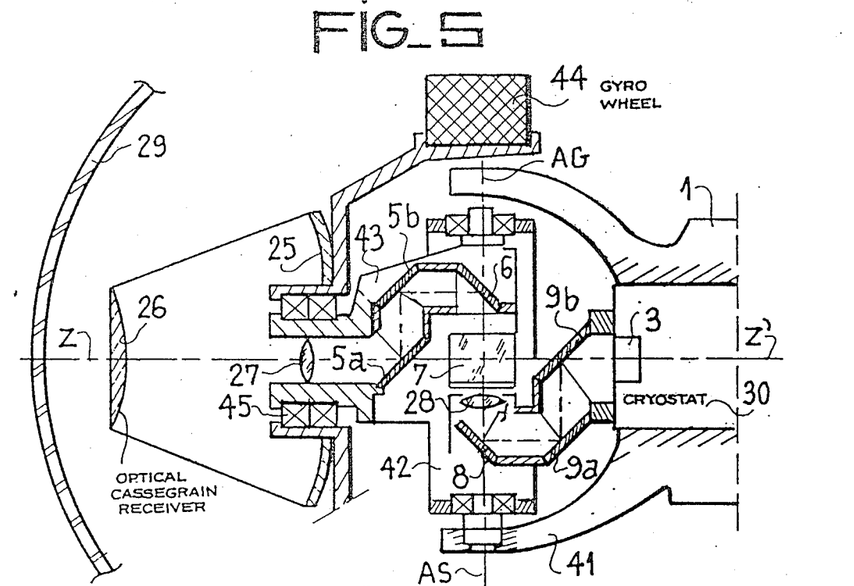
FIG. 5 illustrates one example of construction of the device shown in FIGS. 1 and 4 as applied to a homing unit.

FIG. 5 shows an application to a homing unit, the image-displacement device being constituted by seven mirrors in accordance with an embodiment which is similar to that shown in FIG. 4. The optic axis Z is considered as aligned with the longitudinal axis Z' of the missile in the reference position corresponding to a zero angular deviation both in elevation and in azimuth. The unit is represented in two axial half-sections along orthogonal planes which pass respectively through the azimuth axis AG in the case of the upper half-section and through the pitch axis AS in the case of the lower half-section. The optical receiving system is formed by a Cassegrain entrance assembly consisting of a principal mirror 25 and a secondary mirror 26, followed by a lens or a set of dioptric elements at 27, then at 28. In this example, the mirrors 25 and 26 of the Cassegrain assembly are driven by the gyro wheel 44. The assembly 25-26-27 can be designed as an afocal system in order to re-form the light beam in the form of parallel rays at the entrance of the image-displacement device, the design function of the optical element 28 being to focus on the receiving plane of the detector 3. This latter can consist of a camera tube such as a vidicon or of a solid circuit constituted by a mosaic of detectors known as a charge-coupled device (CCD). The complete assembly is placed at the end of a missile behind a protection radome 29 which permits the passage of the useful radiation to be detected such as, for example, infrared radiation within a well-defined spectral band. The portion 30 behind the detector is provided with cooling means of the cryostat type.

Figure 6:
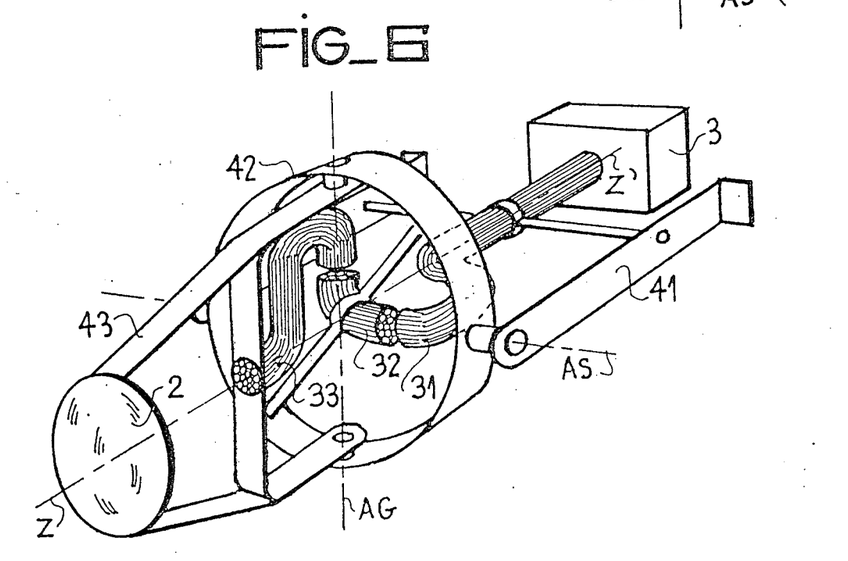
FIG. 6 shows an alternative embodiment of the video imagery device according to the invention in which optical fibers are employed for producing an image displacement.

FIG. 6 shows a diagram of an alternative embodiment of a video imagery device in which optical fibers are employed for producing an image displacement. The fibers are made up of three sections each forming a bundle of optical fibers. The ends of said sections are oriented along the respective axes Z, AG, AS, Z' in succession. Thus the entrance face of the first section 33 which is rigidly fixed to the frame 43 is centered on the axis Z and perpendicular to said axis whilst its exit face is centered on the axis AG and maintained centered on said axis by mechanical means which have not been shown in the figure for the sake of enhanced simplicity. The second section 32 or central section is supported by the frame 42 and has the intended function of returning the beam in the direction AS. The entrance face of said central section is coupled with the exit face of the section 33 and the exit face of said central section is centered and perpendicular to AS. Finally, the third section 31 which is supported by the frame 41 returns the beam along the axis Z'. The entrance face of said third section is coupled with the exit face of the element 32 and the exit face of said third section is centered on the axis Z' in the detection plane. In this alternative embodiment, the receiving optical element focuses the radiation at the level of the entrance face of the first section 33.

Figure 7:
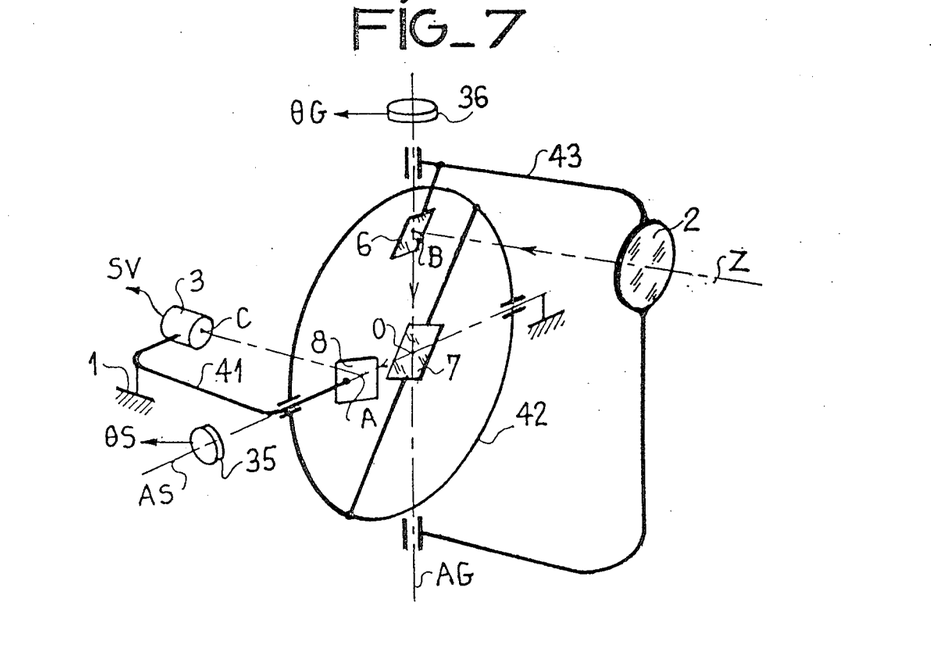
FIG. 7 shows an alternative embodiment of the device shown in FIG. 1 and entailing the use of a small number of optical deviating elements.

FIG. 7 is a schematic illustration of another alternative embodiment of the device of FIG. 1 in which a minimum member of three mirrors is employed for obtaining an image displacement by means of a parallax AB between the entrance axis Z and the exit axis Z'. The mirror 6 reflects the direction Z along the axis AG and the mirror 8 reflects the direction AS along the axis Z'. By inclining these mirrors at an angle of 45° respectively to the axes AG and AS, the reflections from the three mirrors 6, 7 and 8 take place at 90°.

Each of the solutions described in the foregoing produces a rotation of the image in the detection plane as a result of the possible displacements of the axis Z with respect to the axis Z' both in elevation and in azimuth. This movement of rotation takes place about the exit optic axis Z' with an amplitude equal to the algebraic sum of the rotations of the axis Z in elevation and in azimuth. If the image rotation is designated as $\theta R$, the rotation in elevation is designated as $\theta G$, the rotation in azimuth is designated as $\theta S$, we have the relation: $\theta R = \theta G + \theta S$. In order to provide a remedy for this image rotation, the device according to the invention is provided with compensation means which are represented in FIG. 1 by pickups 35 and 36 such as rotary potentiometers in order to measure respectively the parameters $\theta S$ and $\theta G$, and a compensation circuit 37 which produces a suitable control SC from the values $\theta S$ and $\theta G$. The detected video signal SV is applied to a utilization circuit 38. The control SC can be applied at the level of the detector in accordance with one of the design solutions described below.

Figure 8:
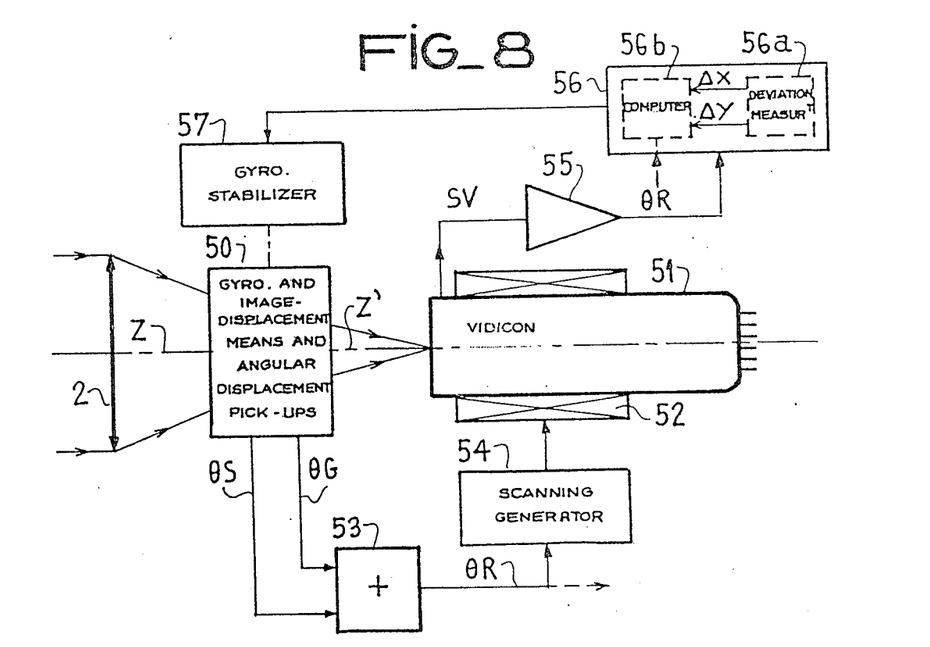
FIG. 8 is a diagram of the video imagery device in which an electrical solution is adopted in order to compensate for image rotation.

A first design solution shown in FIG. 8 is applicable to a television homing unit, the detector being constituted by a tube or a solid mosaic. The block 50 represents an assembly comprising the stabilizing means, the image-displacement means and angular displacement pickups. The detector shown in the figure is a vidicon tube 51 with deflecting coils 52 which are symmetrical in line and in field. The values $\theta S$ and $\theta G$ delivered by the pickups are summated in a circuit 53 so as to obtain a signal corresponding to the image rotation $\theta R$. This signal is applied to a circuit 54 which corresponds to the scanning generator in the embodiment shown and controls the modification of the scanning sawtooth signals in order to cause the scan to rotate by the value $\theta R$. The other circuits shown relate to the homing function. The video signal SV amplified at 55 is applied to a target-tracking processing circuit 56 which produces signals for controlling precession in elevation and in azimuth, said signals being applied to a gyroscope stabilization device 57; it is considered that the circuits 55 to 57 are constructed in accordance with known techniques. Another solution consists in carrying out an electronic correction at the level of the deviation measurement devices at the output of the TV tracking device 56. In fact, since the angular position of the image is known at each instant, then if $\theta S$ and $\theta G$ are known, it is only necessary to convert the delivered values of measurement of angular deviation with respect to axes associated with the camera to values referred to axes which are associated with the rotating image. This conversion corresponds to a simple change of axis by rotation $\theta R$. The deviation measurement circuit 56a produces the data $\Delta x$ and $\Delta y$ of deviation of the target with respect to the system of reference axes associated with the camera and these values are converted with respect to the axes associated with the rotating image. If $\Delta S$ and $\Delta G$ designate the new values, these latter are deduced from the first values by the relations:

$$\Delta S = \sqrt{\Delta x^2 + \Delta y^2} \cdot \cos \beta \text{ and } \Delta G =$$

$$\sqrt{\Delta x^2 + \Delta y^2} \cdot \sin \beta \text{ with } \beta = \arctan \frac{\Delta y}{\Delta x} = \theta R,$$

these operations being performed in a computation unit 56b. The solution may also be mechanical by considering the means 54 as a position-control circuit for controlling the rotation of the detector about the exit optic axis Z' corresponding to the center of the image. Since the detector is placed on a stationary portion of the missile structure, the cooling system can be very simple by having recourse to thermal conduction with said structure. The parasitic torques to be overcome in the case of rotation of the detector (connecting wires, cooling pipes, and so on) are not liable to interfere with the quality of gyroscopic stabilization.

Figure 9:
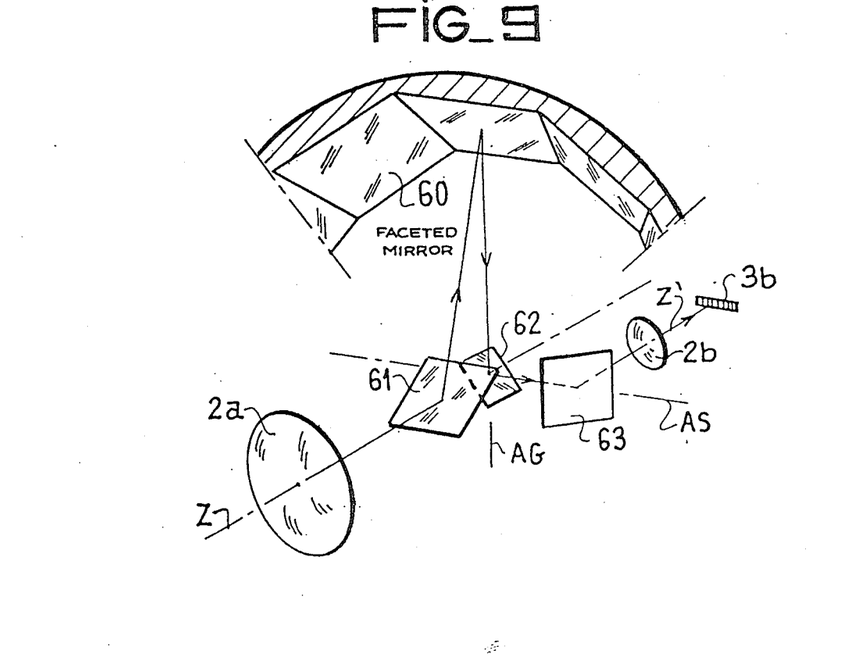
FIG. 9 is a simplified diagram of an alternative embodiment of the video imagery device in the event that this latter comprises an optical deviating system and a linear array of detectors.

In other embodiments of video imagery devices, the detector is constituted by a simple linear array and optical deflecting means are provided for causing the field image to pass in front of the linear detector array. A structure of this type is illustrated in FIG. 9 in which the mechanical elements for gyroscopic stabilization have been omitted for the sake of enhanced simplicity. The optical focusing system comprises an optical formula represented by a lens 2a and one or a number of elements located upstream of the detector array 3b and also represented by a lens 2b. A deflecting optical system placed between said lenses may comprise in accordance with known techniques a faceted mirror 60 which is driven by the gyro wheel and is adapted to rotate about the axis Z. The incident beam is reflected by a plane mirror 61 to the faceted mirror 60 and the reflection is then directed optically to the detector. An azimuthal scan is obtained as a result of rotation of the mirror 60. An elevation scan may be produced in addition by pivotal displacement of the mirror 61 or as a result of a different inclination of the successive facets of the mirror 60 with respect to the axis of rotation Z.

In accordance with the invention, the structure described in the foregoing is arranged in conjunction with an image-displacement device in which the detector array is made stationary. The corresponding means are constituted by two mirrors 62 and 63 and by an arrangement of elements 60 and 61, with the result that the entrance optic axis Z is finally reflected in the direction AG of the gimbal suspension. The mirror 62 performs the same function as the mirror 7 of FIG. 1 and the mirror 63 (or plurality of mirrors) finally produces the deviation along the desired axis Z' which terminates at the center of the linear array of detectors. It is worthy of note that the mirror 63 performs the same function as the element 8 in the assembly shown in FIG. 7 and may be replaced by two or more mirrors in order to suppress the parallax between Z and Z' in accordance with the design concept of FIG. 1 or FIG. 5, for example.

Figure 10:
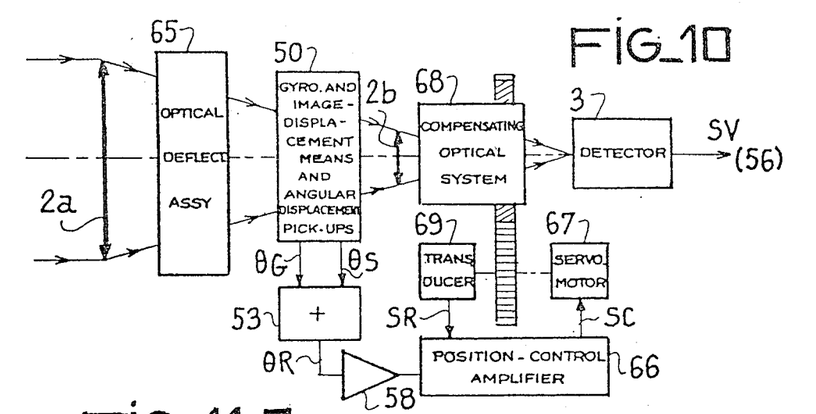
FIG. 10 is a diagram of a device as shown in FIG. 9, in which an optical solution is adopted in order to compensate for image rotation.
Figures 11A, 11B, 11C:
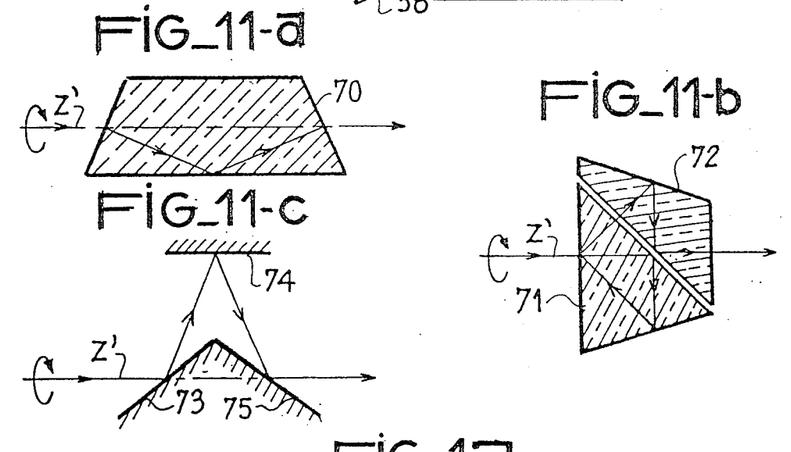
FIGS. 11a, 11b and 11c illustrate different embodiments of the optical system for providing compensation in the device of FIG. 10.
Figure 12:
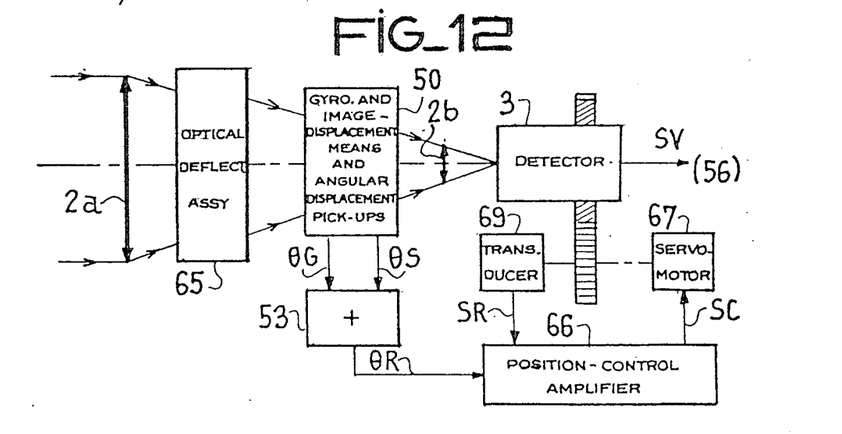
FIG. 12 is a diagram of a device as shown in FIG. 9 in which a numerical solution is adopted in order to compensate for image rotation.

Homing units which make use of a linear detector array instead of a mosaic or a tube usually operate within an infrared spectral band. FIGS. 10 to 12 correspond to such applications but are also applicable to visible radiation and the block 65 corresponds to the optical deflecting assembly. The embodiment of FIG. 10 is an optical solution providing compensation for image rotation. The signal $\theta R$ which is amplified at 58 is applied to a position-control amplifying circuit 66 which controls via the output SC a servomotor 67 which drives a compensating optical system 68 and a transcribing transducer 69. The transcribing signal SR is compared at 66 with the value $\theta R$ to be re-attained. The optical element 68 which is inserted in the chain between the image displacement at 50 and the detector 3 can be constructed in different ways by means of a Wollaston prism 70 (as shown in FIG. 11a) which rotates about the axis Z', or by making use of an equivalent assembly constituted by so-called Pechan prisms 71-72 (as shown in FIG. 11b), or by means of three mirrors 73, 74 and 75 (as shown in FIG. 11c). The amplifier 58 is designed to have a gain of 0.5 in order to ensure a rotation of $\theta R/2$ of the optical system at 67, thus producing by reflection the desired image rotation $\theta R$.

The embodiment according to FIG. 12 shows a mechanical solution in which the detector 3 is driven in rotation about the axis Z' by means of a control system which is similar to that of FIG. 10.

It will now have become readily apparent that the video imagery device hereinabove described can be designed in a large number of alternative embodiments and it should be understood that any variant in accordance with the characteristics set forth in the foregoing does not constitute any departure from the scope or the spirit of the present invention. In particular, the design solutions of an optical type (as shown in FIGS. 10 and 11) and of a mechanical type (as shown in FIG. 12) affording compensation for image rotation are applicable to devices which are not provided with the optical deflecting system and with a linear detector array.

What is claimed is:

1. A video imagery device comprising a support means for a unit constituted by a receiving optical element for focusing the radiation on an image detector rigidly fixed to a support means, a gyroscopic assembly having two degress of freedom for stabilizing the receiving optic axis, said assembly being constituted by a gimbal suspension provided with two mechanical axes of rotation which pass through its center in order to produce angular displacements in elevation and in azimuth and to cause spatial rotation of the optic axis relatively to a reference axis associated with the support means and terminating at the detector, an optical deviating means for bringing the direction of the optic axis into a position corresponding to the reference axis, said gimbal suspension and said optical deviating means being so determined that the optical deviation path passes through a first mechanical axis of rotation aforesaid and then passes through the second mechanical axis of rotation via the center of the gimbal suspension.

2. A device according to claim 1, wherein the image-displacement means comprise three mirrors, a first mirror being positioned on a first mechanical axis of rotation in order to reflect the entrance optic axis along said first mechanical axis, a second mirror being located at the center of the gimbal suspension in order to subsequently reflect the optic axis along the second mechanical axis of rotation and a third mirror being located on said second mechanical axis in order to finally reflect the optic axis along the reference axis.

3. A device according to claim 1, wherein the image-displacement means comprise at least five mirrors in a configuration in which the entrance optic axis and the reference axis coincide at the center of the gimbal suspension, a first mirror on the entrance optic axis being coupled with a second mirror on a first mechanical axis in order to reflect the optic axis along said first mechanical axis, a third mirror at the center of the gimbal suspension being subsequently intended to reflect the optic axis along the second mechanical axis, a fourth mirror on said second mechanical axis being coupled with a fifth mirror on the reference axis in order to finally reflect the optic axis along said reference direction.

4. A device according to claim 3, wherein provision is made for seven mirrors, the first mirror being replaced by two parallel mirrors inclined at 45° with respect to the entrance optic axis, the fifth mirror being replaced by two parallel mirrors inclined at 45° with respect to the reference axis, the other mirrors being also inclined at 45° with respect to the directions having a corresponding mechanical axis, with the result that all reflections take place at 90°.

5. A device according to claim 4, wherein said device comprises an arrangement of three prisms for constituting the seven mirrors, a first prism having three reflecting faces being capable of rotating about a first mechanical axis, a second prism being provided with a reflecting face at the center of the gimbal suspension, and a third prism being provided with three reflecting faces and capable of rotating about the second mechanical axis.

6. A device according to claim 1, wherein the image-displacement means comprise three successive sections of optical fibers, a first section being intended to bring the direction of the entrance optic axis into a position corresponding to the direction of a first mechanical axis, a second section at the center of the gimbal suspension being adapted to return the optic axis in the direction of the second mechanical axis, and the third section being adapted to terminate at the detection plane, the optical receiving element being adapted to focus the image on an end face of the first section.

7. A device according to claim 1, wherein the detector is a linear detection array and comprises an optical deflecting system for scanning the field image in at least one direction, the optical deflecting system being located downstream of an optical entrance objective and followed by an image-displacement optical system.

8. A device according to claim 7, wherein the optical deflecting system comprises a reflecting mirror and a faceted mirror which is driven in rotation by a gyro wheel, said mirrors being so arranged as to deflect and return the entrance optic axis in the direction of a first mechanical axis, and wherein the image-displacement optical system comprises a first mirror at the center of the gimbal suspension in order to subsequently reflect the optic axis along the second mechanical axis and at least one second mirror for finally reflecting the optic axis along the reference axis.

9. A device according to any of claims 2 to 8 wherein said device further comprises means which compensate for image rotation at the level of the detector as a result of said spatial rotation.

10. A device according to claim 1, wherein said device further comprises means which compensate for image rotation in the detection plane, and wherein said means comprise an angular displacement pickup for measuring the rotation in elevation, an angular displacement pickup for measuring the rotation in azimuth, and compensation circuits comprising a circuit for adding the measured elevation and azimuth values.

11. A device according to claim 10, wherein the detector is a camera tube equipped with deflecting coils which are symmetrical in line and in field, the output of the adding circuit being applied to the scanning generator circuit for producing image rotation by modification of the scanning sawtooth signals.

12. A device according to claim 10, wherein the output of the adding circuit is applied via an amplifying circuit having a gain of 0.5 to a position-control unit which drives a correcting optical system about the reference axis, said correcting optical system being constituted by a Wollaston prism, an assembly comprising Pechan prisms, or an assembly comprising three mirrors.

13. A device according to claim 10, wherein the output of the adding circuit supplies a position-control unit for driving the detector in rotation about the reference axis.

14. A device according to claim 10, wherein the image rotation parameter is applied to a computing circuit included in a target tracking and processing system which comprises a deviation measurement circuit for measuring the relative displacements of the target with respect to a system having an axis associated with the detector, the computing circuit being intended to carry out the conversion of said relative displacement values in order to take the image rotation into account.

* * * * *